(12) United States Patent
Huetinck

(10) Patent No.: US 7,360,554 B2
(45) Date of Patent: *Apr. 22, 2008

(54) INTEGRATED GAS METER BAR DEVICE AND LOCKING SHUT-OFF VALVE

(75) Inventor: Mark Huetinck, Brea, CA (US)

(73) Assignee: R.W. Lyall & Company, Inc., Corona, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/635,238

(22) Filed: Dec. 7, 2006

(65) Prior Publication Data

US 2007/0079876 A1  Apr. 12, 2007

Related U.S. Application Data

(63) Continuation of application No. 10/665,579, filed on Sep. 19, 2003, now Pat. No. 7,152,621.

(51) Int. Cl.
  *F16K 35/00* (2006.01)
(52) U.S. Cl. .................. 137/385; 251/286; 70/180
(58) Field of Classification Search .......... 137/385; 251/286, 287, 288; 70/180
  See application file for complete search history.

(56) References Cited

U.S. PATENT DOCUMENTS

| | | | |
|---|---|---|---|
| 1,282,024 A | 10/1918 | Bartholomay | |
| 1,639,431 A * | 8/1927 | Hatton, Jr. ................ | 137/385 |
| 1,696,757 A * | 12/1928 | Ford ....................... | 137/315.06 |
| 1,838,778 A | 12/1931 | McKee | |
| 3,168,280 A * | 2/1965 | Mueller ................... | 251/217 |
| 3,187,570 A | 6/1965 | Mueller | |
| 3,245,257 A | 4/1966 | Anderson | |
| 3,272,009 A | 9/1966 | Leopold, Jr. et al. | |
| 3,296,860 A | 1/1967 | Smith et al. | |
| 3,296,861 A * | 1/1967 | Mueller et al. ........... | 73/201 |
| 3,382,888 A | 5/1968 | Mueller et al. | |
| 3,970,334 A | 7/1976 | Campbell | |
| 4,971,289 A * | 11/1990 | Pietras ................... | 251/90 |
| 5,315,869 A | 5/1994 | Bier et al. | |
| 5,501,331 A | 3/1996 | Lyall et al. | |
| 5,689,938 A | 11/1997 | Lyall et al. | |
| 5,918,624 A | 7/1999 | Young | |
| 5,934,304 A | 8/1999 | Peterson et al. | |
| 6,283,153 B1 * | 9/2001 | Brisco et al. ........... | 137/625.47 |
| 7,152,621 B1 * | 12/2006 | Huetinck ................ | 137/385 |

* cited by examiner

Primary Examiner—John Fox
(74) Attorney, Agent, or Firm—Fulwider Patton LLP

(57) ABSTRACT

A control valve assembly and for a gas delivery system is disclosed comprising a valve housing and piping combination adapted to mate with a gas meter outlet, the valve including a main inlet and an auxiliary inlet for bypassing the main inlet, and a poppet disposed within the housing for selectively opening the respective inlets and for closing both inlets. The poppet is controlled by a valve stem extending into the valve housing and coupled to the poppet, such that rotation of the valve stem orients the poppet in the predetermined positions to selectively open the respective inlets. The valve stem is rotated using a lever arm extending radially from the valve stem, where the lever arm is adapted to carry a locking member at a distal end. When the locking member is carried by the lever arm, rotation of the lever arm may be denied due to interference of the locking member with the valve housing, and the poppet in such case prevents flow through either of the inlets.

6 Claims, 5 Drawing Sheets

INTEGRATED GAS METER BAR DEVICE AND LOCKING SHUT-OFF VALVE

CROSS-REFERENCES TO RELATED APPLICATIONS

This application is a continuation application of U.S. patent application Ser. No. 10/665,579, filed Sep.19, 2003 now U.S. Pat. No. 7,152,621, and claims priority to same and is hereby incorporated by reference in its entirety.

BACKGROUND OF THE INVENTION

1. Field of the Invention

The present invention is related to piping or plumbing systems for the installation of gas meters for supplying gas to residences, office buildings and the like.

2. Description of the Prior Art

Natural gas is a well-known, clean, and relatively inexpensive fuel source. As such, gas distribution systems have been widely installed in various population centers throughout the industrialized world.

Housing shortages have led to a demand for relatively inexpensive housing developments and the corresponding supply of utilities and infrastructure. In the distribution of natural gas, service gas lines are typically branched out from main gas distribution pipelines laid along a utility route, for instance, under a roadway or the like, and connected to the individual residences or commercial buildings in a development. At the point of delivery, such systems typically incorporate a meter, a gas shutoff valve and regulator located above ground for connection to a residence inlet. The inlets can be stubbed outwardly from a side wall of the dwelling and terminating in a connection nipple projecting perpendicular to the face of such sidewall. It has become a common practice to lay underground service lines to the individual dwellings located, for instance, in a new housing project. When the time comes to activate the gas service, personnel are tasked with visiting the construction site to install gas meters for all houses in a single development or development section so as to provide for efficient and inexpensive installation. Oftentimes, such installations involve the connecting together of various threaded components, valves and connectors, sealing and pressure testing the various joints. These tedious and time consuming on-site semi-skilled tasks adds materially to the cost of making such installations.

The gas shut-off valve is typically located adjacent the stubbed inlets to the dwelling on the exterior of side. As such, the shut-off valve is exposed and can be actuated by unauthorized personnel, improperly instructed workers and home owners, and would-be vandals. In addition to tampering of the shut-off valve, the valve can be misaligned through inadvertent contact or other accident as is known to happen on construction sites. Accordingly, there is a need to provide a security device in place that can be easily and quickly manipulated to maintain a shut-off condition while allowing authorized personnel to remove the security device for flow of gas through the valve.

Additionally, many current models of meters incorporate upwardly opening inlet and outlet nipples spaced laterally apart in a vertical plane parallel to the surface of the wall of a dwelling having the stub inlet fitting projecting therefrom. The installer is thus faced with the task of selecting the necessary elbows, unions, pipes and plumbing fittings and threading them together so as to connect the meter riser through the meter to the inlet stub. This challenge oftentimes requires skilled plumbing at the installation site, sealing of the plumbed joints, pressure tests and reconfiguration to pass inspection. This adds considerably to the time and cost of installation.

In recognition of the needs of this type, it has been proposed to construct a prefabricated meter bar with an inverted U-shaped inlet pipe for connection between the meter riser and meter inlet nipple, and an L-shaped 90 degree outlet tube for connection with a laterally disposed residents inlet fitting. A device of this type is shown in U.S. Pat. No. 5,501,331 to Lyall and assigned to the Assignee of the present application. Such devices sometimes incorporate inline bypass valves designed for allowing access by an auxiliary gas supply, but such valves do not suffice as main gas shutoff valves. Such devices, while experiencing considerable commercial success, suffer the shortcoming that they require separate shutoff valves and thus necessitate a separate threaded connection with the consequent potential for leakage or misfit, as well as added installation time at the job site.

There thus further exists a need for an efficient meter bar device that can be installed at the construction site with a valve for controlling gas flow and that does not necessitate separate threaded elements beyond that required for connection to the meter riser, the meter inlet nipple, and the stub inlet.

SUMMARY OF THE INVENTION

In a first preferred embodiment, the present invention is characterized by a control valve incorporating a main inlet and a bypass inlet regulated by a rotating valve stem, which itself is driven by a radially extending lever arm that can be locked in a "valve shut off" position using a locking member such as a barrel lock or other suitable locking means. The control valve preferably includes a bypass conduit for introducing an auxiliary gas supply while interrupting the main gas supply flow. Rotation of the lever arm controls flow through the main inlet, the bypass inlet, and also provides for a shut-off position wherein no gas may flow through the valve.

The lockable control valve can be integrally formed in a T-shape with a stem pipe, where the stem pipe is adapted at an opposite end to mate with a gas meter outlet coupling to form a unitary construction that can be leak tested prior to shipment and installation in the field. The first preferred embodiment can further be combined with an inlet loop pipe adapted at a first leg to mate with an inlet coupling of the gas meter, the separation of the stem pipe and first leg of the inlet loop pipe preset by a crossbar of a length determined by a standard distance between the meter inlet and outlet coupling.

The present invention is further characterized by the integral meter bar device constructed with an inlet loop pipe and outlet stem pipe held in predetermined spaced relationship with a right angle control valve being integrated in the outlet end of the stem pipe for connection with an inlet fitting for a domicile or other building.

Other features and advantages of the invention will become apparent from the following detailed description taken in junction with the accompanying drawings which illustrate one of the many embodiments of the present invention.

DETAILED DESCRIPTION OF THE PREFERRED EMBODIMENTS

Figure 1:
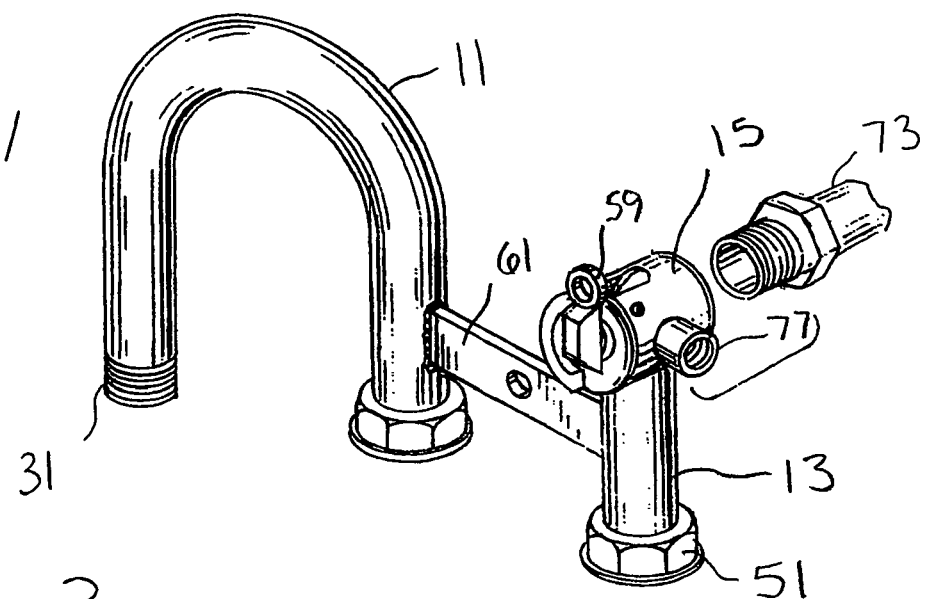
FIG. 1 is a perspective view showing an integrated meter bar and inlet valve of the present invention.
Figure 2:
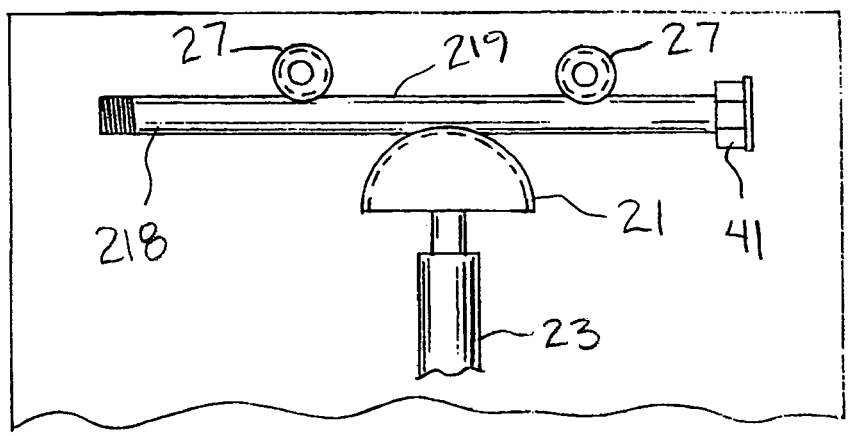
FIG. 2 is a front view, in reduced scale, of an inlet loop pipe incorporated in the meter bar device of FIG. 1, and showing the pipe being formed to a loop shape.
Figure 3:
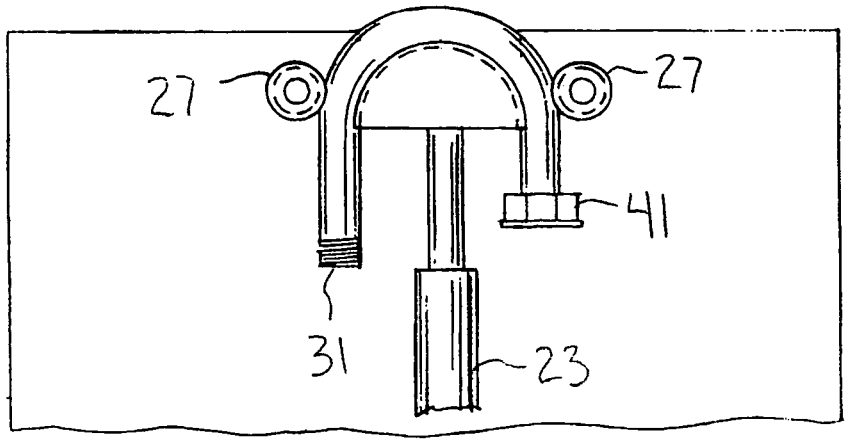
FIG. 3 is a front view similar to FIG. 2 but showing the loop pipe further formed.
Figure 4:
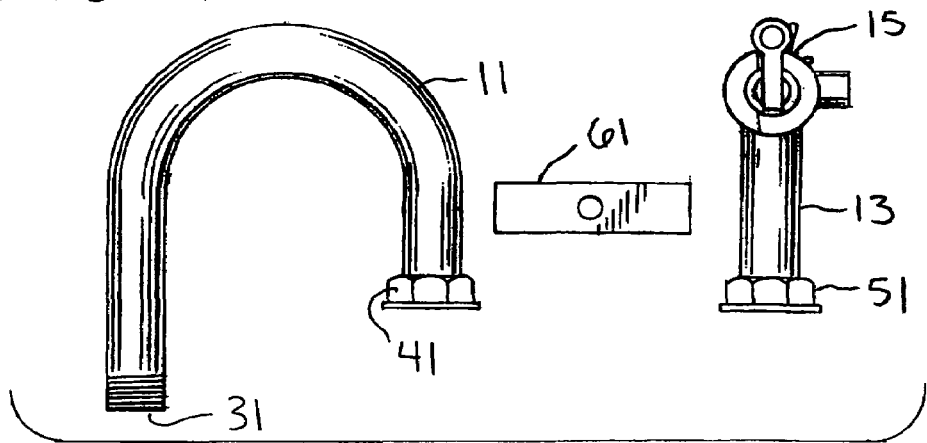
FIG. 4 is an exploded view of the meter bar device shown in FIG. 1.
Figure 5:
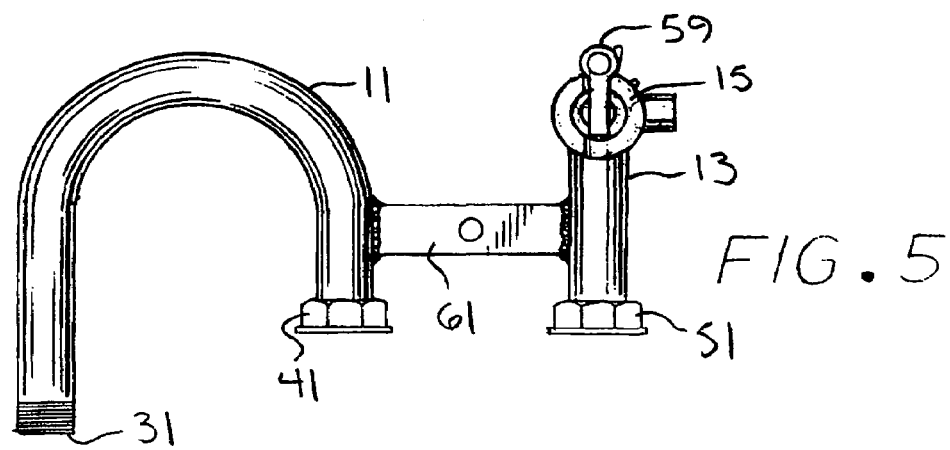
FIG. 5 is a front view similar to FIG. 4 but depicting the components of the meter bar device assembled together.
Figure 6:
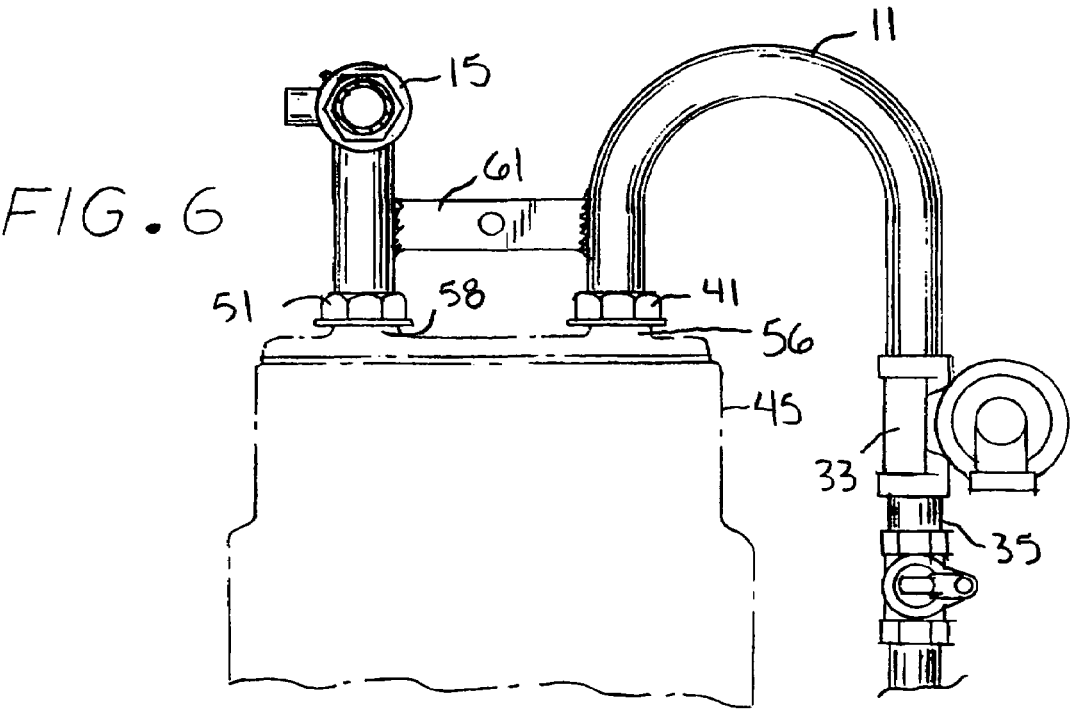
FIG. 6 is a back view of the device shown in FIG. 5 and depicting a aided riser and meter in open lines.

Referring to FIGS. 1 and 6, a meter bar device is illustrated including an integrated inlet pipe loop 11 and outlet stem pipe 13 spaced a predetermined distance apart with a gas inlet valve 15 integrated into the top of the stem 13 and opening perpendicular to the stem 13.

Typical prior art meter bars incorporate meter outlet stems or the like with a straight valve, thus requiring coupling of plumbing elbows or the like to make a turn to access a residential fitting projecting horizontally from the sidewall of a dwelling or the like. Because the workers tasked with installing such fittings at on site may possess various skill levels, the expertise required to effect such fittings may lead to a trial and error process as the selection of various plumbing components is attempted to achieve the connections. This inefficient process can lead to considerable additional expense and delay. Additionally, the service truck must be supplied with a number of different sized and shaped components to make the various connections and, when the connections are made, they must be fitted for the particular installation. In each case, the joints must be satisfactorily sealed and pressure tested, a task that from time to time results in failure and reconnection of the joints. The prefabricated systems of the present invention permit testing of the units prior to delivery to the various sites, eliminating the need for on site testing.

Referring to FIGS. 1-5, it will be appreciated that the meter bar of FIG. 1 may be prefabricated at the factory and sized for cooperating with standard size meters. This procedure involves the selection of a length of steel pipe 218 placed over a die 21, and form into a loop 11 by a pneumatic cylinder 23 driving the medial portion 219 thereof upwardly between a pair of rollers 27 (FIG. 3) to achieve a desired inverted U-shaped configuration. The pipe itself will typically be threaded on the inlet end 31 for connection with a union 33 on the top end of a riser 35 (FIG. 6). The opposite, or outlet end of such loop pipe 11 is formed with a conventional flange and hex-nut sealing flange and a hex-nut 41 for making a connection with a threaded union (not shown) forming the inlet 56 to a conventional gas meter 45 (FIG. 6).

The stem pipe 13 may be in the form of a 1-inch NPS steel pipe about 4" high and configured on its bottom end with a sealing flange and a hex-nut 51 for connection with the outlet 58 of the meter 45.

Welded to the top end of such stem pipe 13 is a machined 90 degree control valve 15 having a soft seat or poppet 90 for positive shutoff of the gas. The control valve 15 is configured with an inlet 301 coupled to the outlet of the stem pipe 13 and an outlet aligned with the stub inlet 73 of destination housing. A bypass inlet 77 on the control valve 15 provides a conduit for a secondary or alternate source of gas such as compressed natural gas to be provided to the domicile of the stub inlet 73. The bypass inlet 77 circumvents the meter 45 while closing off the supply of gas directed from the meter, and can be used in situations such as when the meter is being repaired or the main supply of gas is interrupted. By arranging the control valve perpendicular to the stem pipe and parallel with the projecting stub inlet of the dwelling, the arrangement reduces the number of fitting and connections that require selecting, securing, and testing on the installation site. Moreover, because the combination control valve, stem pipe, cross bar, and loop pipe can be pre-assembled and tested at the factory, the need for on-site testing is significantly reduced.

Flow of gas through the control valve 15 is manually controlled through one of the two inlets by an axially extending valve stem 57 positioned concentrically located in the valve housing. The valve stem 57 is shaped to conform with and be retained in the valve housing interior within annular recesses 305, 307, and includes a pair of radially recessed slots for retaining first and second O-rings 309, 311, respectively. The presence of the O-rings 309, 311 seal the valve to prevent gas from escaping though the valve stem orifice, and promote rotation of the valve stem 57 within the valve housing obviating the need for lubricants that can wear or need replenishing. The valve stem 57 is preferably retained in the valve housing by a weather proofing disk 313 adapted to prevent contaminants from entering the valve housing while physically capturing the valve stem in the housing. A lock ring 315 maintains the weather proofing disk 313 in place in the valve stem orifice 317.

Within the valve housing is a cylindrical soft seat or poppet 90 positioned adjacent the inlet 301 and the bypass inlet 77 so as to occlude the respective inlets and prevent the flow of gas into the valve 15. The poppet 90 is rotatable inside the valve housing and is coupled to the valve stem 57 at its proximal end. The poppet 90 comprises a void such as a window or cut-out 330 that moves within the housing so as to occupy a position adjacent the main inlet 301, the secondary inlet 77, or neither inlets. When positioned adjacent an inlet, the window 330 opens a pathway through the valve at that inlet to regulate the flow through the valve. To control the position of the window 330, a notch or slot in the poppet 90 is engaged by a key 68 or tab on the valve stem to interlock the two elements for fixed rotation about the longitudinal axis of the housing. That is, when the valve stem 57 is rotated, the coupling of the poppet through the key 68 of the valve stem imparts an equal rotation of the poppet, and hence relocates the window 330. Because the valve stem extends outside of the valve stem housing, the valve stem 57 can be used to manipulate the position of the poppet 90 within the control valve 15 as described more fully below.

The valve stem 57, while captured in the valve housing by the snap ring 315 and disk 313, rotates about a longitudinal axis of the housing of the control valve. The orientation of the valve stem is determined by a lever arm 59 mounted to the end of the valve stem 57 and extending perpendicular thereto. Using two positive rotational stops 319, 321 incorporated into the valve housing architecture, the lever arm 59 travels between two extreme positions shown in FIGS. 10 and 12 as a twelve o'clock and six o'clock, respectively. That is, the lever arm 59 rotates with the valve stem 57 about the longitudinal axis of the housing in a fixed relationship between said twelve o'clock position and six o'clock position. These two positions define the extreme angular position of the valve stem and, due to the coupling of the valve stem and the poppet 90, the extreme angular positions of the poppet as well.

Figure 10:
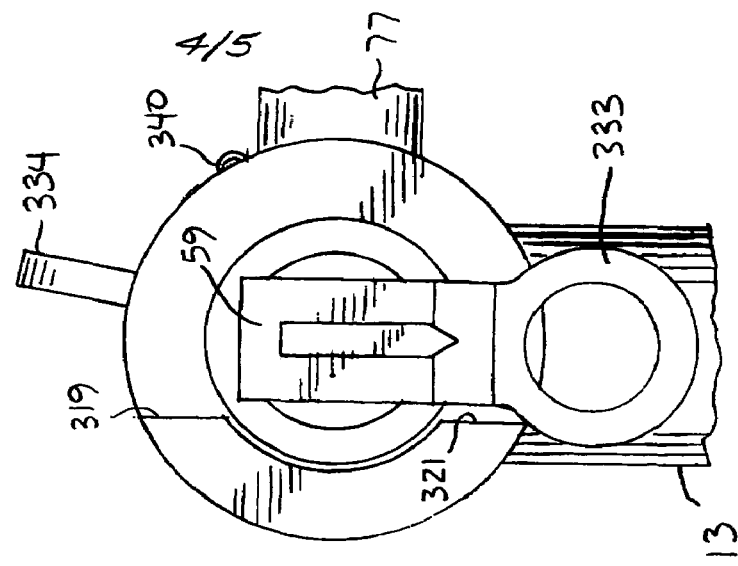
FIG. 10 is a front view, in enlarged scale, of the control valve at the outlet end of the stem pipe shown in the off position.
Figure 11:
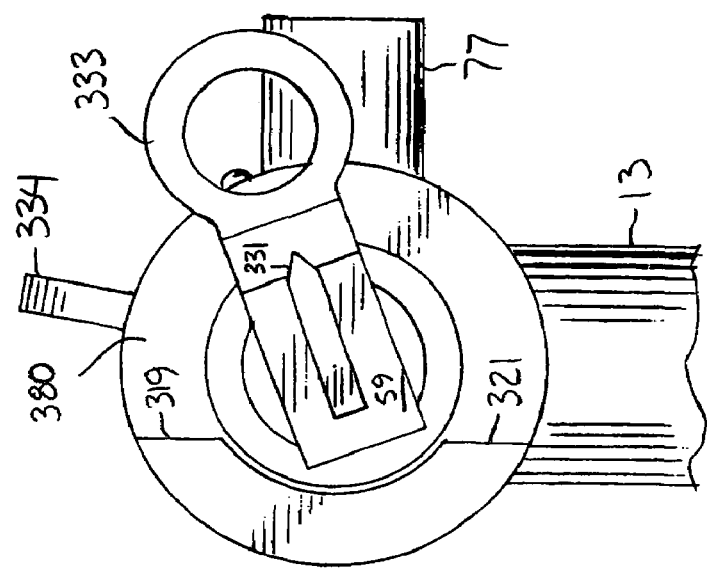
FIG. 11 is a front view, in enlarged scale, of the control valve at the outlet end of the stem pipe shown in the bypass position.
Figure 12:
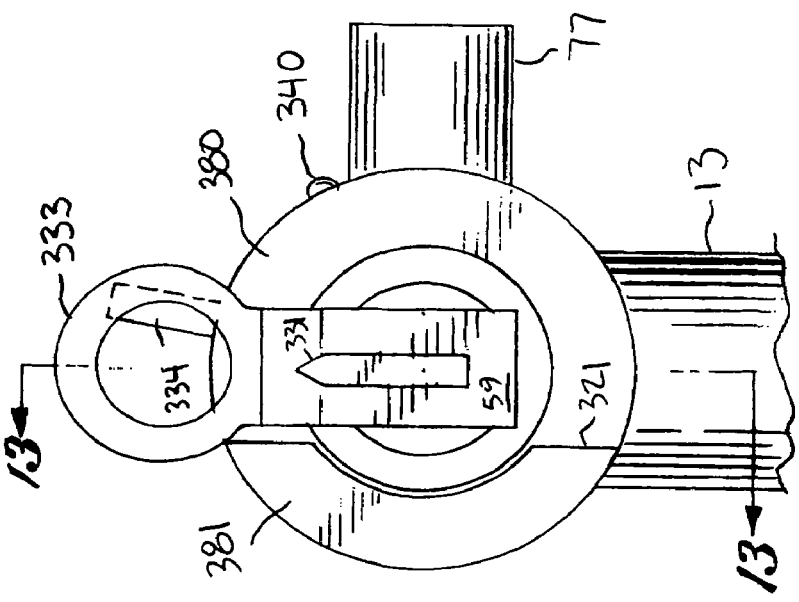
FIG. 12 is a front view, in enlarged scale, of the control valve at the outlet end of the stem pipe shown in the on position.
Figure 13:
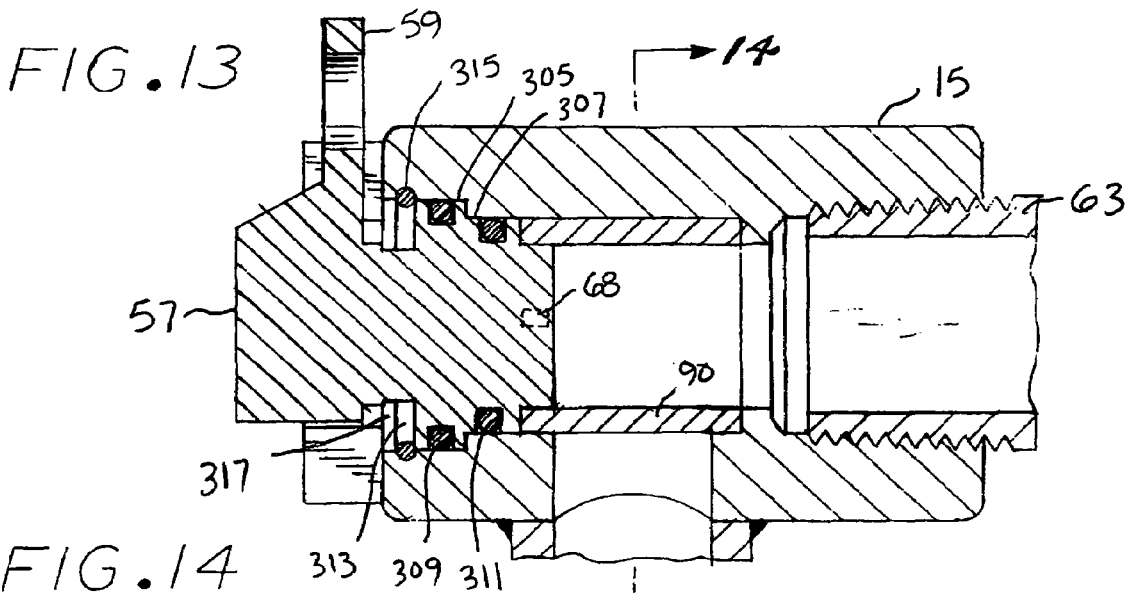
FIG. 13 is a cross-sectional view, in enlarged scale, taken along line 13 of FIG. 10, of the control valve at the outlet end of the stem pipe illustrating the valve assembly.

FIGS. 10-12 illustrate the rotation of the lever arm 59 about an annular surface 380 of the valve housing. The lever arm 59 rotates between two extreme positions, the twelve o'clock position illustrated in FIG. 10 and the six o'clock position shown in FIG. 12. FIG. 11 illustrates an intermediate, or two o'clock position described more fully below. The extreme positions (twelve o'clock and six o'clock) are fixed by physical stops 319, 321 that limit further rotation of the lever arm 59. The physical stops 319, 312 are formed by an elevation 381 in the annular surface 380 of the valve housing forming two shoulders 319, 321 serving as rotational stops for the lever arm 59.

Figure 14:
FIG. 14 is a cross-sectional view, in enlarged scale, taken along line 14 of FIG. 13, of the control valve at the outlet end of the stem pipe illustrating the position of the seat opening in the closed position of FIG. 10.

FIG. 10 shows the position of the lever arm 59 corresponding to a shut off or closed configuration of the control valve 15. An embossed arrow 331 may be formed on the face of the lever arm 59 to indicate direction or status. With the lever arm 59 and valve stem 57 rotated in this position, the poppet 90 within the valve housing is rotated so as to block both the main inlet of the valve (precluding flow of gas from the metered source) as well as the secondary or auxiliary port 77. This position of the poppet 90 is shown particularly in FIG. 14, a cross sectional view looking axially through the valve. The poppet 90 is cylindrical and includes the window 330 that permits the flow of gas to pass across the poppet 90 and enter the valve. In FIG. 14, the poppet 90 is rotated in the closed position and the window 330 of the poppet 90 is adjacent neither the valve main inlet 301 nor the auxiliary inlet 77. In this position, the poppet 90 acts as a seal to prevent the flow of gas through the valve.

Figure 8:
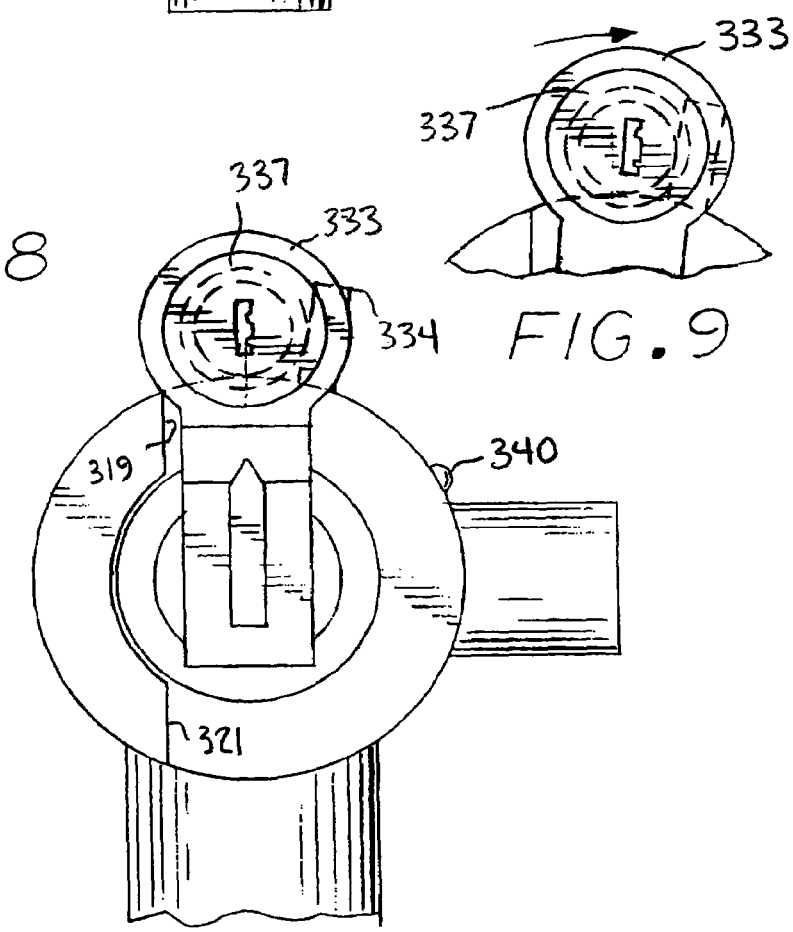
FIG. 8 is a front view, in enlarged scale, of the control valve at the outlet end of the stem pipe and barrel lock.
Figure 15:
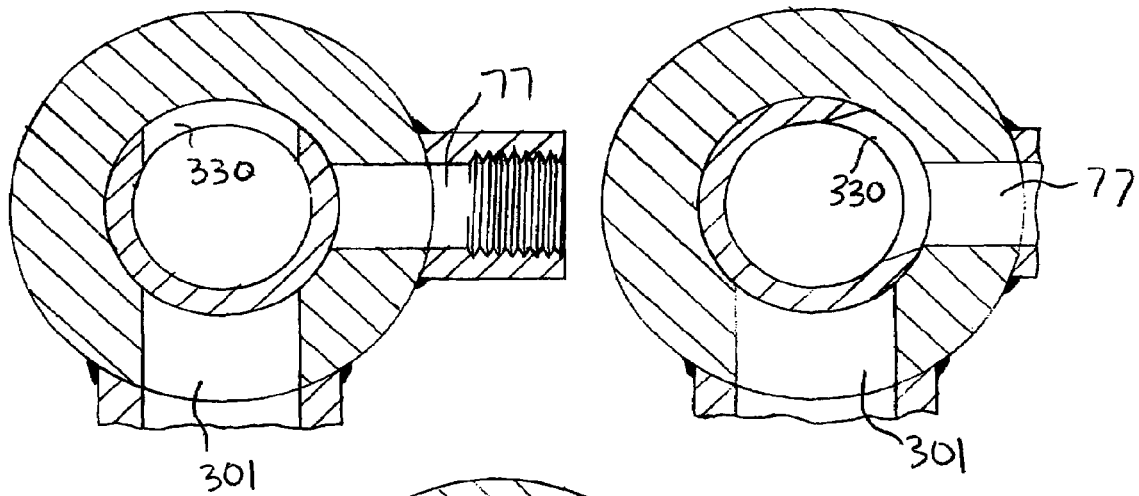
FIG. 15 is a cross-sectional view, in enlarged scale, taken along line 14 of FIG. 13, of the control valve at the outlet end of the stem pipe illustrating the position of the seat opening in the bypass position of FIG. 11.

In FIG. 11, the lever arm 59 is rotated from the twelve o'clock position (closed) to the two o'clock position, corresponding to an opening of the auxiliary gas supply port while maintaining closed the inlet 301 to the main gas supply. The two o'clock position can preferably be demarcated by a bead 340, hole, dimple, or other marker on the valve housing (FIG. 8). This condition is illustrated in FIG. 15, where the poppet 90 is oriented such that the window 330 is adjacent the auxiliary line inlet 77 permitting gas flowing from this inlet to enter the valve. At the same time, the poppet 90 seals the main inlet 301 to permit only the auxiliary line to feed gas to through the valve.

Figure 16:
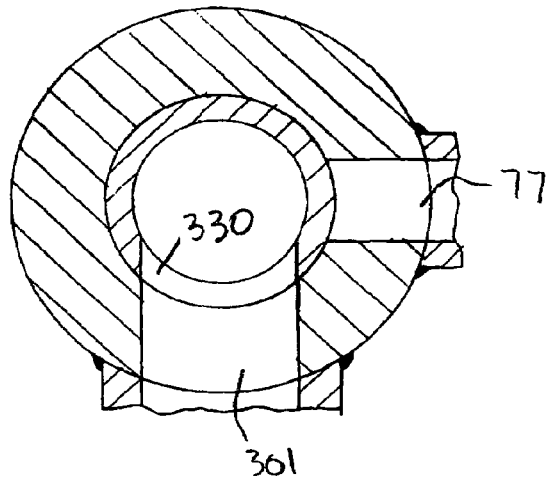
FIG. 16 is a cross-sectional view, in enlarged scale, taken along line 14 of FIG. 13, of the control valve at the outlet end of the stem pipe illustrating the position of the seat opening in the open position of FIG. 12.

In FIG. 12, the lever arm 59 is rotated to the six o'clock position (open) corresponding to the position permitting gas flow from the meter outlet to enter the valve through the main inlet 301, where it is directed through the valve to the stub inlet of the destination edifice. FIG. 16 illustrates the position of the poppet 90 in the open position corresponding to FIG. 12, where the poppet's window 330 is aligned with the channel and inlet 301 corresponding to the main gas supply. The window position of the adjacent the main supply channel allows gas to travel through the circuit including the control valve from the meter riser 35, to the inverted U-shaped loop pipe 11, into the meter inlet and out of the meter outlet, to the stem pipe 13, through the control valve 15, and ultimately to the stub inlet 73 of the recipient housing.

Figure 7:
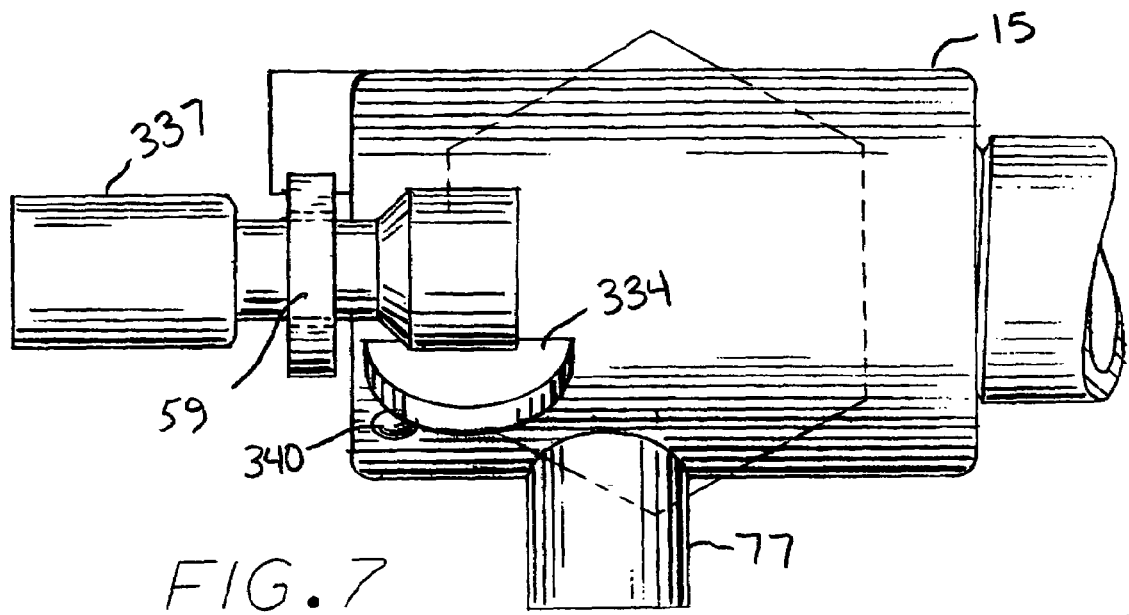
FIG. 7 is a top view, in enlarged scale, of the control valve at the outlet end of the stem pipe and barrel lock.
Figure 9:
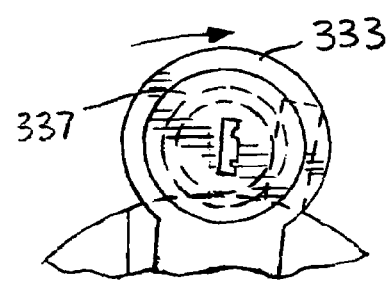
FIG. 9 is a front view, in enlarged scale, of the loop being advanced in the clockwise direction until the barrel lock engages a stop tab.

Thus, by coordinating the window 330 on the poppet 90 with the angular orientation of the valve stem 57 and more particularly the lever arm 59, the respective "closed," "auxiliary," and "open" positions of FIGS. 10-12 will correspond to the window locations shown in FIGS. 14-16, respectively. In a preferred embodiment, the lever arm 59 includes at a distal end a ring or loop 333 sized to receive a barrel lock therein. With a lock 337 carried by the lever arm 59, a projection on the valve housing such as wing stop 334 can cooperate with the rotational stop 319 of the valve housing to trap and restrict the rotation of the lever arm 59 at the twelve o'clock, or shut-off, position. That is, with the lever arm 59 positioned as shown in FIG. 10 corresponding to the valve closed condition, the rotational stop 319 prevents further rotation of the lever arm 59 in the counterclockwise direction (with reference to FIG. 10). With a locking member 337 incorporated into the lever arm (see FIGS. 7-9), there is thus created an interference between the locking member 337 and the wing stop 334 preventing rotation of the lever arm 59 and valve stem 57. Fixing the valve stem 57 in this position prevents gas flow into the valve to provide a policing mode to prevent unauthorized manipulation of the control valve to the "on" position.

The lockable valve described above can be incorporated into a meter bar device as described more fully below.

Referring to FIGS. 1-6, the loop pipe 11 and stem pipe 13 of the meter bar device are held in spaced and oriented relationship with respect to one another by means of a crossbar 61 having the opposite ends thereof welded to the respective exteriors of such pipes. It will be appreciated that in the construction shown, the pipe loop 11, crossbar 61 and stem pipe 13 are disposed in a vertical plane (FIG. 6). The valve 15 is formed with a threaded outlet 63 opening 90 degrees to the plane of the loop and of the loop pipe 11 and the stem pipe 13. In practice, such outlet 63 could open along the plane of the loop pipe and stem pipe 11 and 13, respectively.

Typically, the meter bar device of the present invention may be prefabricated at the factory with the loop pipe 11 and stem pipe 13 welded to the opposite ends of the crossbar 61. The valve 15, with the poppet and seat removed, can be welded to the top end of the stem pipe 13. The seat and poppet may then be installed in a manner well known to those skilled in the art. The device may then be coated with a protective coating of polyester, zinc, or paint. The pipe and valve components may then be leak tested and approved for inventorying and subsequent shipping to the job site. The flow control valve has the additional benefit of being maintenance free, in that there is no need to lubricate the valve once it is installed adjacent the meter. This feature provides obvious benefits in that regularly scheduled maintenance to lubricate the flow valves are avoided by the present invention.

When it is desirable to install meters 45 at a housing development, the service lines for the risers 35 will be run and the risers 35 installed. A sufficient number of meters 45 and meter bar devices of the present invention will be also delivered to the job site for accommodating the residence for which the meters are to be installed. The meters 45 will be mounted in selected spaced relationship to the respective risers 35 and inlet stubs 73.

It will be appreciated that, with the pipe loops and stems 11 and 13 rigidly mounted to the crossbars 61, the respective outlet fitting and inlet fitting 41 and 51 will be held in fixed spaced relationship for ready connection to the respective inlet and outlet nipples 56 and 58 of the meter 45. Such fittings are spaced laterally apart a distance of about 6 inches. Then, connection may be readily made directly from the outlet 63 or the valve 15, either directly to the residential gas or other fuel inlet fitting or through a union or the like. At the same time, the connection may be made from the riser union 33 to the inlet 31 of the pipe loop 11. It will be appreciated that the gas inlet fitting may be a threaded nipple, union, socket or any other plumbing connection well known to those skilled in the art.

Thereafter, any pressure testing or the like required will only require testing of the connections to such riser union 33, threaded meter nipples 43 and 53, and to the valve outlet 63. Consequently, it will be appreciated that the meter bar device of the present invention provides an economical and efficient means for installing gas meters and providing for concurrent installation of a gas shutoff valve.

Having installed the meter bar device as described, the lockable control valve can be quickly locked in the closed position by inserting a barrel lock into the loop 333 of the lever arm 59 with the lever arm occupying the shut off or twelve o'clock position. This will prevent the valve from being turned on by unauthorized personnel, or being inadvertently actuated. When the time arrives to have the gas turned on, or to have an auxiliary supply of gas introduced through the bypass inlet, the lock is simply removed by the authorized personnel and the lever arm 59 rotated to either the two o'clock position for bypass condition or six o'clock position for main gas supply flow through the stem pipe from the meter.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A low pressure flow control valve for connecting with a gas meter and for used downstream of a gas regulator comprising:

a valve housing defining a valve interior and including a first port corresponding to a main inlet and a second port corresponding to a secondary inlet, and an outlet, where said main inlet, secondary inlet, and outlet are each oriented ninety degrees from the other, said main inlet;

a hollow stem pipe integrally formed with said housing's main inlet, said hollow stem pipe configured at a distal end with a gas meter coupling means for coupling said low pressure flow control valve directly to said gas meter via said hollow stem pipe to receive low pressure gas delivered from said gas meter and downstream from said gas regulator, where a longitudinal axis of said stem pipe is perpendicular to a longitudinal axis of said valve housing and where the combination stem pipe and valve housing are leak tested prior to installation in a gas system;

a non-lubricated soft seat disposed within the valve interior adjacent the first and second ports and adapted for rotation to first, second, and third predefined angular positions and wherein an axis of rotation of said soft seat is coincident with a longitudinal axis of said outlet, the soft seat occluding the second port when the poppet is rotated to the first angular position corresponding to gas flow through said gas meter only, occluding the first port when the poppet is rotated to the second angular position corresponding to bypass flow through the secondary inlet, and occluding both the first port and the second port when the poppet is rotated to the third angular position corresponding to a non-flow condition; and a valve stem mounted on an exterior of said valve housing and mechanically linked to said soft seat where rotation of said valve stem about a longitudinal axis of said valve maneuvers said soft seat between said first, second, and third predefined angular positions to control the flow of gas through said valve interior.

2. The flow control valve of claim 1 wherein the housing further comprises a first and second valve stem motion arresting surfaces disposed at least one hundred eighty degrees apart, the first valve stem arresting surface preventing said valve stem from rotating beyond a position corresponding to the soft seat third angular position, and the second valve stem arresting surface positioned to prevent said valve stem from rotating beyond a position corresponding to the soft seat first angular position.

3. The flow control valve of claim 1 where the valve stem includes a ring formed at a distal end for carrying a locking member, and a radially projecting tab integrally formed on an exterior surface of said valve housing and positioned to block movement of said valve stem when said ring is carrying said locking member.

4. The flow control valve of claim 1 where rotation of the valve stem to an intermediate position between the first and second valve stem arresting surfaces corresponds to the soft seat occupying the second angular position.

5. The flow control valve of claim 1 wherein the valve housing includes a zinc protective coating.

6. The flow control valve of claim 1 further comprising a weather seal and snap ring cooperating to hold the valve stem in the housing at the valve stem orifice.

* * * * *